(12) United States Patent
Stephens, Jr.

(10) Patent No.: US 9,821,465 B2
(45) Date of Patent: Nov. 21, 2017

(54) ENHANCED ENVIRONMENT SIMULATOR FOR PROXY ROBOT HANDLERS

(71) Applicant: Kenneth Dean Stephens, Jr., San Ramon, CA (US)

(72) Inventor: Kenneth Dean Stephens, Jr., San Ramon, CA (US)

( * ) Notice: Subject to any disclaimer, the term of this patent is extended or adjusted under 35 U.S.C. 154(b) by 844 days.

(21) Appl. No.: 14/271,437

(22) Filed: May 6, 2014

(65) Prior Publication Data

US 2015/0321337 A1 Nov. 12, 2015

(51) Int. Cl.
| | |
|---|---|
| *G06F 17/50* | (2006.01) |
| *B25J 9/16* | (2006.01) |
| *B25J 3/00* | (2006.01) |
| *B25J 5/00* | (2006.01) |
| *A63B 22/00* | (2006.01) |
| *A63B 22/02* | (2006.01) |

(Continued)

(52) U.S. Cl.
CPC ......... *B25J 9/1689* (2013.01); *A63B 22/0023* (2013.01); *B25J 3/00* (2013.01); *B25J 5/00* (2013.01); *B25J 9/161* (2013.01); *A63B 22/0235* (2013.01); *A63B 24/0087* (2013.01); *A63B 2022/0271* (2013.01); *A63B 2024/009* (2013.01); *A63B 2024/0096* (2013.01); *A63B 2071/0638* (2013.01); *A63B 2220/05* (2013.01); *A63B 2220/78* (2013.01); *A63B 2220/806* (2013.01); *G05B 2219/40126* (2013.01); *G05B 2219/40311* (2013.01); *G05B 2219/40318* (2013.01); *G06F 2203/012* (2013.01); *Y10S 901/01* (2013.01)

(58) Field of Classification Search
None
See application file for complete search history.

(56) References Cited

U.S. PATENT DOCUMENTS 5,577,981 A * 11/1996 Jarvik ................. A63B 21/154
434/247
5,792,031 A * 8/1998 Alton ................. A63B 69/0059
482/78

(Continued)

OTHER PUBLICATIONS

Noma et al. Development of Ground Surface Simulator for Tel-E-Merge System Virtual Reality, Mar. 2000, Proceeding IEEE.*

(Continued)

*Primary Examiner* — Omar Fernandez Rivas
*Assistant Examiner* — Cuong Luu (57) ABSTRACT

An omnidirectional treadmill environment simulator is disclosed. The omnidirectional treadmill environment simulator includes a circular simulator stage area, a plurality of transport mechanisms that maintain an object at or near the center of a circular simulator stage area and at least one processor. The processor is configured to collect position data of the object and process the position data to control the transport mechanisms. Also included is a receiver for receiving data from a remote location and a terrain analysis computer for processing the data received from the remote location. The terrain analysis computer collects the data received from the remote location to form an accurate simulation of an upcoming condition at the remote location. The omnidirectional treadmill environment simulator includes a transmitter for transmitting the position data to a remote location.

21 Claims, 8 Drawing Sheets

(51) Int. Cl.
A63B 24/00 (2006.01)
A63B 71/06 (2006.01)

(56) References Cited

U.S. PATENT DOCUMENTS

| | | | | | |
|---|---|---|---|---|---|
| 6,050,822 | A * | 4/2000 | Faughn | ............ | G09B 9/00 |
| | | | | | 345/952 |
| 6,135,928 | A * | 10/2000 | Butterfield | ............ | G06F 3/011 |
| | | | | | 482/66 |
| 7,399,258 | B1 * | 7/2008 | Sugar | ............ | A63B 22/0235 |
| | | | | | 482/51 |
| 8,147,503 | B2 * | 4/2012 | Zhao | ............ | G06K 9/3241 |
| | | | | | 382/128 |
| 8,152,699 | B1 * | 4/2012 | Ma | ............ | A61H 1/0229 |
| | | | | | 482/54 |
| 8,675,018 | B2 * | 3/2014 | Mishra | ............ | B65G 13/10 |
| | | | | | 345/629 |
| 2003/0120183 | A1 * | 6/2003 | Simmons | ............ | A61F 4/00 |
| | | | | | 600/595 |
| 2003/0153438 | A1 * | 8/2003 | Gordon | ............ | A63B 22/02 |
| | | | | | 482/92 |
| 2004/0106504 | A1 * | 6/2004 | Reiffel | ............ | A63B 22/0235 |
| | | | | | 482/54 |
| 2005/0024005 | A1 * | 2/2005 | Rodnunsky | ............ | B66C 13/08 |
| | | | | | 318/649 |
| 2007/0270285 | A1 * | 11/2007 | Gill | ............ | A63B 22/02 |
| | | | | | 482/54 |
| 2010/0115411 | A1 * | 5/2010 | Sorokin | ............ | G03B 37/04 |
| | | | | | 715/723 |
| 2010/0210978 | A1 * | 8/2010 | Oddsson | ............ | A61H 1/0229 |
| | | | | | 601/24 |
| 2011/0009241 | A1 * | 1/2011 | Lane | ............ | A63B 24/0087 |
| | | | | | 482/8 |
| 2016/0221186 | A1 * | 8/2016 | Perrone | ............ | B25J 9/1661 |

OTHER PUBLICATIONS

Robler et al. Motion Compression Applied to Guidance of a Mobile Teleoperator Conference Paper, IEEE Explore, Sep. 2005.*
Krunic Scalable Software Control of Million-Element Cyber-Physical Systems Using a Graphics Processing Unit University of Colorado, Boulder, Spring Jan. 1, 2010.*

* cited by examiner

Enhanced Environment Simulator for Proxy Robot Handlers

Enhanced Environment Simulator for Proxy Robot Handlers

Enhanced Environment Simulator for Proxy Robot Handlers

FIG. 3
Environment Simulator Operation in Long Path Delay Situations; Treadmill with Hydraulic Aspect Control FIG. 3A
Omnidirectional Treadmill with Variable Pitch and Roll FIG. 3B
Extra-Terrestrial Land Vehicle Simulator in Motion Simulator on Hydraulic Legs
Enhanced Environment Simulator for Proxy Robot Handlers

Enhanced Environment Simulator for Proxy Robot Handlers

Enhanced Environment Simulator for Proxy Robot Handlers

ENHANCED ENVIRONMENT SIMULATOR FOR PROXY ROBOT HANDLERS

CLAIM OF PRIORITY

The present invention claims priority to provisional U.S. Application No. 61/831,370 filed on Jun. 5, 2013, entitled "Enhanced Environment Simulator for Proxy Robot Handlers."

FIELD OF THE INVENTION

The present claimed invention generally relates to robotics. More specifically the present invention relates to human proxy robot systems and environment simulators for the human handlers of proxy robots.

BACKGROUND OF THE INVENTION

This specification is about human telepresence in space. During his or her turn in control of a given proxy robot, the human handler sees and feels and acts through the "person" of that robot: guiding the proxy in exploring; mining; doing science experiments; constructing; observing the earth, planets or stars; launching spaceships to further destinations; rescuing other robots or humans; or simply enjoying an earthrise over the moon's horizon. To maximize this interface, the human handler should have access to an environment simulator that replicates the conditions of the proxy robot's remote location to the greatest possible extent.

In the prior art are several patents dealing with omnidirectional and spherical treadmills, all involving simulated virtual reality (VR) generated by a computer program as opposed to the simulation of the actual environment being experienced by a proxy robot in its remote environment as taught in the present invention. Carmein U.S. Pat. No. 5,562,572 discloses ways to make an omni directional treadmill for VR and other purposes, but the methods and apparatus employed do not anticipate the specification to follow. Nor are his treadmill designs very stable, with the human constrained by balance cuffs, support struts, hand grips and the like just to stay upright.

Carmein '572 also makes brief mention of how the omni-directional treadmill of his invention may be utilized in telepresence in a one-paragraph description of FIG. 18 (FIG. 39 in C.I.P. '256 below), but fails to claim or adequately teach how a human can be productively linked in practice to a robot in some remote location. In the present specification and a companion application pertaining to handler environment simulation, prior art weaknesses, defects and "science fiction" will be overcome as methods and apparatus for a complete human handler-proxy robot system are disclosed.

Latypov U.S. Pat. No. 5,846,134 features a spherical shell inside of which a human walks in treadmill fashion, but this concept is quite distinct from the spherical treadmill disclosed in the current application, where the human handler of a proxy robot stands and moves on the top exterior of a sphere with diameter sufficiently large (typically 30 feet in diameter) that the handler, to all intents and purposes, is moving on a flat surface if that is the remote terrain being simulated.

U.S. Pat. No. 5,980,256, also by Carmein, is a continuation-in-part of '572 above and U.S. Pat. No. 5,490,784. The latter pertains to spherical capsules within which humans can walk (albeit uphill) in any direction, but does not apply to the present invention. The circular form in Carmein's ('256) FIG. 23 does not denote a turntable, but rather defines a circular track unlike the current invention. While Carmein's FIG. 37 and description are somewhat akin to the motion simulator in the current specification's FIG. 7, the point is moot in any case since such motion simulators are well-established in the prior art.

Butterfield U.S. Pat. No. 6,135,928. This patent, which expired in 2008, discloses a spherical treadmill for VR gaming, but it is so small at 6-7 ft. diameter as to never seem flat to its human "rider," who requires a restraining harness and support system just to stay upright. In the Butterfield patent, the sphere basically represents a human-powered trackball, operating in exactly that manner to input x- and y-axis orientation and movement to a VR game on a computer.

Put another way, Butterfield's focus is virtual reality, for fantasy games, while the application below is all about the best-possible simulation of actual reality in a remote location. As a consequence, the Stephens specification does not utilize a small, inflatable sphere as a computer trackball or mouse as taught by Butterfield, but rather uses a much larger and firmer motor-driven spherical treadmill to replicate the terrain upon which a proxy robot is walking, climbing or carrying out various tasks. (Butterfield does depict how a "hill" can be created by moving the user off-center, but the problem with such a small sphere is that there is a constant "hill" created by the small-diameter sphere itself.)

These and other distinctions over the current art will become evident from study of the specification and drawings to follow, which discloses novel systems, methods and apparatus to simulate the environment present at the proxy robotic mission site and thus assure the best possible outcome for that mission.

OBJECTS OF THE INVENTION

One object of the present invention is to describe a viable methodology for human space exploration utilizing proxy robot surrogates in space controlled by humans in environment simulators on earth or elsewhere.

A second object of the present invention is to provide human telepresence on the moon and other locations near earth utilizing proxy robots capable of being controlled by one or more human handlers in real or approximated real time.

A third object of the present invention is to achieve human telepresence on the moon and other locations in space utilizing proxy robot surrogates for humans in simulated environments back on earth or at some other location.

A fourth object of this invention is to provide a viable methodology for space exploration utilizing proxy robots, proxy robot-driven vehicles and robotic vehicles in space controlled by humans on Earth, including a terrain analysis computer which generates an approximated real time video display that allows the human handler to control the movements of each robot or robotic vehicle, as well as data streams representing "terrain just ahead", handler heading, handler step distance, and handler step moment which are fed to circuitry to turns said data into signals to drive motors controlling the roll, pitch and yaw of an environment simulator to maximize the reality of the human handler's environment as the handler controls every move of a remote proxy robot.

A fifth object of this invention is a method and apparatus for the establishment of a surveillance grid through the provision of a plurality of pole cameras which can be dropped onto a body in space from an orbiting spacecraft, satellite, or a balloon or other aircraft.

A sixth object of the present invention is to provide a treadmill for the human handler with provision for changing the pitch and roll of the treadmill to match conditions in the remote location of the proxy robot, where pitch, roll and other positional data are continually adjusted in the handler environment by mechanisms driven by a computer that continually analyzes video and other data from the proxy robot and its remote environment.

A seventh object of the present invention is to provide a method and apparatus for a circular treadmill utilizing a plurality of conveyors to maintain a human handler centered in a simulator staging area.

An eighth object of this invention is further to object seven, wherein an array of cylinders, each housing one or more ball bearing feet and capped with a tile in the shape of an equilateral triangle, can be impelled to move in treadmill fashion along various axes on a staging area.

A ninth object of this invention is further to the circular treadmill of object seven, wherein data representing human handler heading, step distance and step moment is analyzed by a computer that send appropriate signals to the various conveyor mechanisms that constitute the circular treadmill to compensate for handler movement by re-centering the handler on the stage.

A tenth object of this invention is a method and apparatus for varying the pitch and roll of a treadmill by housing that treadmill and a human proxy robot handler in a modified or custom made motion simulator, complete with gravity harness and large video screen, and wherein pitch and/or roll can be modified by signals from a computer that act to vary the length of four or more large hydraulically extending arms supporting the motion simulator, said computer continually monitoring and analyzing video and other data from the remote environment of a proxy robot.

An eleventh object of the present invention is a method and apparatus for varying the momentary elevation as well as the pitch and roll of a vehicle simulator in time with the actual movements and aspect of a vehicle in a remote or off-earth location operated by at least one proxy robot, wherein the vehicle's elevation, pitch and roll are controlled by hydraulic means in communication with data from the remote location signifying the pitch, roll and such path conditions as roughness, bumps and obstacles experienced by the off-earth vehicle; and "follow me" commands from human handler motion sensing means and control monitoring means located within the vehicle simulator to guide the every move of the proxy robot operating the said remotely-located vehicle.

A twelfth object of the present invention is the provision of an environment simulator including a treadmill with variable pitch and roll and infinitely variable heading; wherein the treadmill takes the form of a large sphere which rests upon several large bearings and is rotated by a plurality of rollers in contact with the surface of the sphere so as to turn the sphere in any direction when commanded by circuitry monitoring both the steps of a human handler and the pitch and roll of terrain immediately ahead in the remote location.

A thirteenth object of the present invention is further to object twelve, wherein the spherical treadmill itself moves the handler to a location on the surface of the sphere which exhibits pitch and roll matching terrain conditions in the remote location of the handler's proxy robot.

A fourteenth object of the present invention is further to object twelve, with the added feature of the simulator receiving data from sources on the "person" of the proxy robot as well as surveillance video and stored information from other sources at the remote site that can be analyzed to maximize the simulated environment experience of the handler.

A fifteenth object of the present invention is the provision of a spherical treadmill environment simulator as in object twelve above, wherein the handler is performing tasks in approximated real time such that the handler's "follow me" commands anticipate the position of a proxy robot at some time in the future due to path delay.

A sixteenth object of the present invention is to create an accurate simulation of the terrain in a remote environment by analyzing that terrain on a computer; computer-generating a three-dimensional bar chart of the terrain; and producing a physical rendering of that bar chart by mechanical means.

A seventeenth object of the present invention is further to object fifteen, wherein the mechanical means constitute piston rods that extend and retract hydraulically from signals received by the computer that generates the three-dimensional bar chart.

SUMMARY OF THE INVENTION

Disclosed herein are apparatuses that provide simulation of remote environments in order to enable control of a robotic device in the remote environment.

Pursuant thereto an omnidirectional treadmill environment simulator is disclosed. The omnidirectional treadmill environment simulator includes a circular simulator stage area, a plurality of transport mechanisms that maintain an object at or near the center of a circular simulator stage area and at least one processor. The processor is configured to collect position data of the object and process the position data to control the transport mechanisms. Also included is a receiver for receiving data from a remote location and a terrain analysis computer for processing the data received from the remote location. The terrain analysis computer collects the data received from the remote location to form an accurate simulation of an upcoming condition at the remote location. The omnidirectional treadmill environment simulator includes a transmitter for transmitting the position data to a remote location.

Further disclosed is a remote vehicle simulator. The remote vehicle simulator includes a plurality of extendable legs configured to extend and contract to simulate the contours of a surface terrain of a remote location. The remote vehicle simulator also includes a terrain analysis computer, wherein the terrain analysis computer is configured to receive terrain data of the surface terrain of the remote location and wherein the computer is enabled thereby to construct upcoming terrain conditions for use in the remote vehicle simulator and a processor that is configured to receive terrain data of the surface terrain of the remote location. The processor processes the terrain data to control the plurality of extendible legs to simulate the surface terrain of the remote location. The processor is also configured to collect operational data of a vehicle mounted on the plurality of extendible legs. The terrain analysis computer receives terrain data of the surface terrain of the remote location and the computer is enabled thereby to construct upcoming terrain conditions for use in the remote vehicle simulator and the simulator includes a transmitter for transmitting the operational data to a robotic device at the remote location.

Further disclosed is an omnidirectional treadmill environment simulator in which the circular simulator stage is a spherical platform. The spherical platform includes an upper support from which the spherical platform protrudes through a circular opening in the upper support, a boundary between the spherical platform and the upper floor which facilitates movement of the spherical platform and a lower support upon which the spherical platform rests and allows the spherical platform to rotate with a minimal of resistance.

Further disclosed is an immersive environment simulator apparatus that includes a plurality of cylindrical telescoping piston mechanisms configured to extend and retract to simulate a three-dimensional physical terrain and a computer that receives data of an actual physical terrain and generates a data matrix of the simulated three-dimensional physical terrain. A control unit is included that is in communication with the computer that provides commands to the plurality of the cylindrical telescoping piston mechanisms to extend and/or contract the plurality of the cylindrical telescoping piston mechanisms to correspond to the simulated three-dimensional physical terrain and a plurality of tiles resting on each of the plurality of the cylindrical telescoping piston mechanisms upon which an object is placed. Furthermore, the received data is continuously streamed such that as the object moves along the simulated three-dimensional physical terrain provided by the plurality of the cylindrical telescoping piston mechanisms, the object movement along the simulated three-dimensional physical terrain mimics the actual physical terrain.

DETAILED DESCRIPTION OF THE INVENTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

Figure 1A:
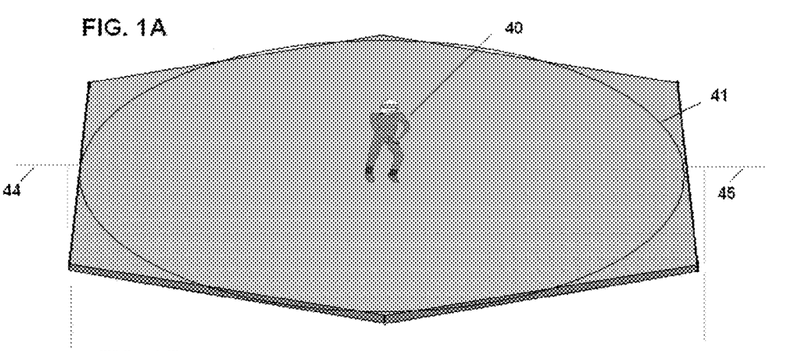
FIG. 1A is an illustration of a perspective view of an exemplary apparatus for achieving a novel "circular" or omnidirectional treadmill incorporating three two-way conveyor mechanisms.

FIGS. 1A-1H and 2A-2M depict methods and apparatus for achieving a novel "circular" or omnidirectional treadmill incorporating three two-way conveyor mechanisms. Specifically, FIG. 1A illustrates the active area of the entire apparatus, with a handler 40 standing in the middle of a circle 41 that defines the simulator stage.

Figure 1B:
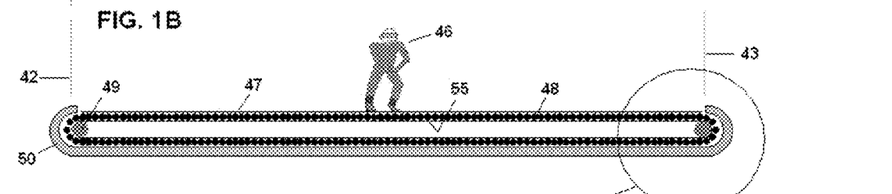
FIG. 1B is an illustration of an exemplary plane view of an apparatus for achieving a novel "circular" or omnidirectional treadmill incorporating three two-way conveyor mechanisms.

Vertical lines 42-43 are over the width of that active area along horizontal line 44-45 generating FIG. 1B, a crosssection diagram of one of three transport mechanisms used to maintain handler 46 at or near the center of the simulator stage. A representative line of ball bearings 48 capped with tile sections 47 contact the top of stage table surface 55. At each end of the tile transport mechanism is a roller 49, which may also take the form of a paddle-wheel or gear with offset sections to conform to individual tile-bearing elements (see FIG. 1E below).

A guide structure 50 wraps around the transport mechanism and bottom portion of the conveyor. As individual bearing-tile elements leave the stage they are flipped over and slide tile-down through the guide structure, with their bearings rolling on the top. To facilitate this upside-down transit, the inner bottom surface of the guide structure should have a hard, slippery surface like a coating of Teflon® or similar material.

Figures 1C, 1G:
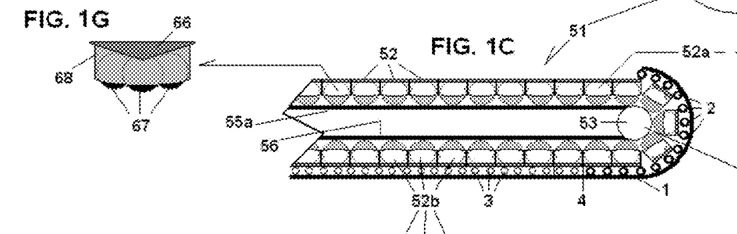
FIG. 1C is an illustration of an exemplary plane view of a conveyor mechanism.
FIG. 1G is an illustration of a tile with a bearing housing including a lower profile cylinder.

FIG. 1C is a magnified view of portion 51 in FIG. 1B, with tile elements 52 are visible atop cylinder 52a and on the bottom of cylinders 52b. Tiles 52a and 52b slide against ball bearings 2, 3 between them and the entire guide structure 1 not active as the treadmill surface. In FIG. 1B this guide structure is labelled 50. Each cylinder in turn houses one or more ball bearings facing away from the tile surface, per FIGS. 1F and 1G below. Also shown in FIG. 1C is stage support table 55a, roller or gear mechanism 53, and the bottom portion of the stage table 56, and an exemplary position 4 where the conveyor might be halted in perfect alignment with the other conveyors. This will be discussed more fully in FIG. 2M and FIG. 2N below.

Figures 1D, 1F, 1H:
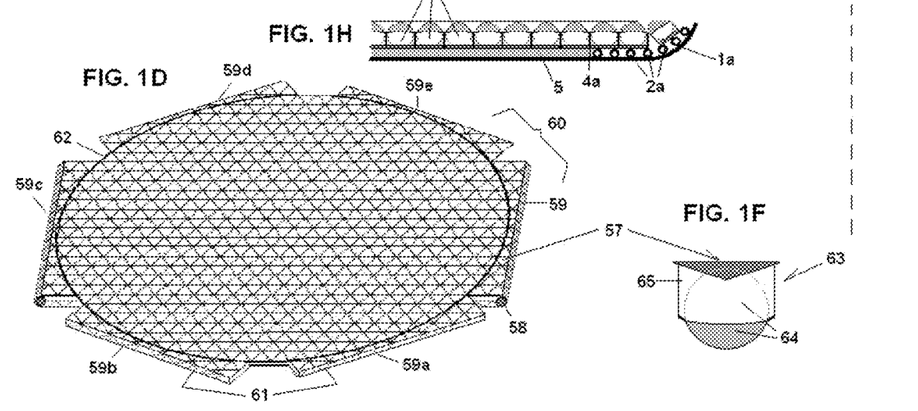
FIG. 1D is an illustration of an exemplary perspective view of a circular treadmill incorporating three two-way conveyor mechanisms.
FIG. 1F is an illustration of a tile with ball bearing cylinder.
FIG. 1H is an illustration of an exemplary partial plane view of a conveyor mechanism.
Figure 1E:
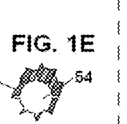
FIG. 1E is an illustration of an exemplary elongated gear of a roller transport mechanism.

FIG. 1E shows an elongated gear 54 alternative to roller transport mechanism 53. The width of the "paddle wheel" gear is proportional to the width of the conveyor (see 59, 59c in FIG. 1D), and each paddle can be angled or broken into individual sections to better accommodate individual cylinder elements.

FIG. 1F is a further magnified view of one ball bearing cylinder 63, including triangular tile surface 57, cylindrical bearing cup 65, and large ball bearing element 64.

A presently preferred bearing housing is depicted in FIG. 1G, including a lower profile cylinder 68 that supports three ball bearings 67 rather than the single, larger bearing depicted elsewhere for simplicity. The advantage of the three-bearing housing is that each such element is stand-alone, so that any weight exerted on triangular tile 66 will be equally distributed on the three bearings and maintain the entire element stable and level at all times.

FIG. 1D illustrates the environment simulator concept, including a circular stage area 62 covered by a plurality of tiles 60, individually shaped as equilateral triangles 57 which mesh together to form the floor of the simulator stage. The simulator includes three conveyor mechanisms, all powered by pressure rollers 58 or paddle wheel gears like the one 54 shown in FIG. 1E.

One conveyor is powered by transport mechanisms 59, 59c in the 3 o'clock-9 o'clock position on the circle. This conveyor compensates for any handler movement along a 90 degree-270 degree line, moving in either direction to continually keep the handler centered on this axis.

Another conveyor has transport mechanisms 59a and 59d at the 150 and 330 degree positions on the circle, and similarly acts to continually compensate for any handler movement along this axis. The third conveyor's transport mechanisms 59e and 59b are at the 30 and 210 degree positions on the circle, similarly moving the handler's floor in one direction or the other to compensate for movements off center.

Beneath the entire tile surface 60 depicted is a second tile surface 61, directly corresponding to the surface above but inverted (upside down) from the top surface. This lower surface constitutes the bottom side of each of the three conveyors depicted, with each forming a continuous loop of tile/cup/bearing elements as shown in FIGS. 1B and 1C.

FIG. 1H shows a modified form of the conveyor mechanism depicted in FIG. 1C, wherein the housing ball bearings 2a extend only around the portion of the housing 1a that extends beyond the active treadmill stage area (62 in FIG. 1D). In the configuration of FIG. 1H, the bearing area is replaced by a smooth sliding surface 5 extending under the entire stage area to result in smoother conveyor motion.

Figure 2A:
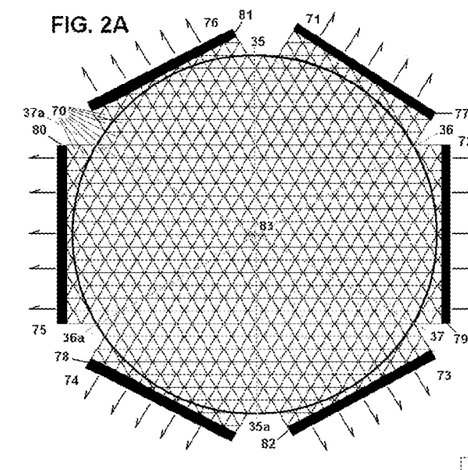
FIG. 2A is an illustration of an exemplary perspective view of a circular treadmill showing a mesh of individual equilateral triangular tiles.

FIG. 2A is a more detailed look at the omnidirectional treadmill simulator of FIG. 1, showing a mesh of individual equilateral triangular tiles 70 completely filling the active stage area. Point 83 marks the center of the stage, and defines the general area where the proxy robot human handler is to be maintained by compensating movement of one or more of the three treadmill conveyors.

Assuming the top of the page to be north for this discussion, one conveyor mechanism 71, 74 spans between rollers or paddle wheel gears 77-78 and compensates for handler movements in either a northeast or southwest direction (30 degree-210 degree axis). A second conveyor mechanism 72, 75 is located between rollers or gears 79 and 80, and compensates for handler movements to either the east or west (90 degree-270 degree axis). The third conveyor mechanism 73, 76 is located between transport rollers or gears 81, 82, and compensates for handler movements to the northwest or southeast (150 degree-330 degree axis). A line 35, 35a perfectly bisects conveyor 72, 75, passing through the center point 83 on the stage. A second line 36, 36a similarly bisects conveyor 73, 76, while a third line 37, 37a bisects remaining conveyor 71, 74.

Figure 2B:
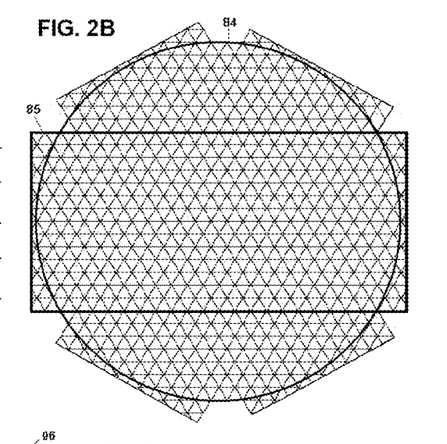
FIG. 2B is an illustration of an exemplary perspective view of a circular treadmill highlighting an active conveyor.

FIGS. 2A and 2B illustrate the operation of the circular treadmill. If the handler steps from stage center 83 directly to the east (right on the figures), the conveyor that will become active is the one highlighted in FIG. 2B, running between 90 degrees and 270 degrees, i.e., between motorized rollers 79 and 80 in FIG. 2A. Since the handler moved a step to the east, this conveyor will move toward the west in approximately the same amount, but come to rest in a position where all the tiles align once again. This is absolutely necessary to the operation of the circular treadmill, since all tiles must be in alignment so that conveyors in the other directions can similarly activate (see FIG. 2E below).

Figure 2C:
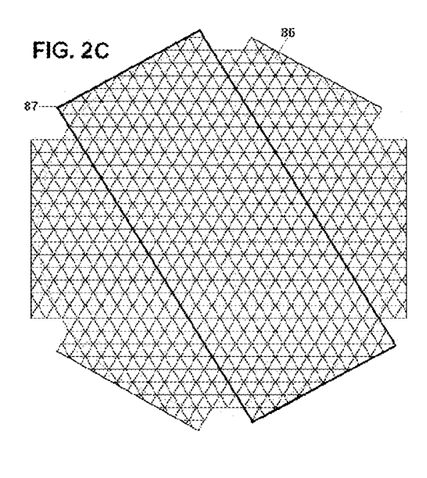
FIG. 2C is an illustration of an exemplary perspective view of a circular treadmill highlighting another active conveyor.

If the handler moves to the northwest 76 or southeast 73 on FIG. 2A, this will activate the conveyor highlighted in FIG. 2C. Conveyor motors on that axis will compensate for the handler's steps, maintaining handler position near center 83 at all times.

What happens when the handler travels in a north (or south) direction, a position between conveyors 71, 74 and 76, 73? In this case, the processor 95 will assign priority to one conveyor; for example first moving the handler along axis 71, 74 to center the handler on line 37, 37a; and next along axis 76, 73 to center that conveyor on line 36, 36a. The reasons for this two-step process are 1) that only one conveyor can move at a time; and 2) any handler movement off center can be corrected by the compensating movement of two conveyors. When each of the two effected conveyors have moved that handler to their particular center line, the handler will once again be located in the center of the stage.

Figure 2D:
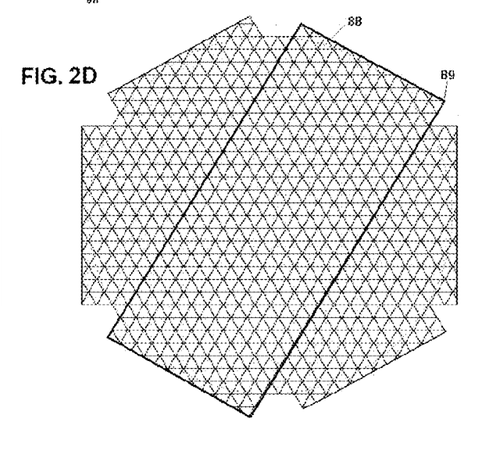
FIG. 2D is an illustration of an exemplary perspective view of a circular treadmill highlighting still another active conveyor.

If the handler moved to the west rather than the east, the same conveyor 79, 80 would activate, but the motors would turn their rollers in the opposite direction, causing that conveyor to travel to the east. Likewise, the handler might move to the northeast or southwest, causing conveyor 71, 74 to activate and reposition the handler to center point 83. This conveyor is depicted in FIG. 2D.

Figure 2E:
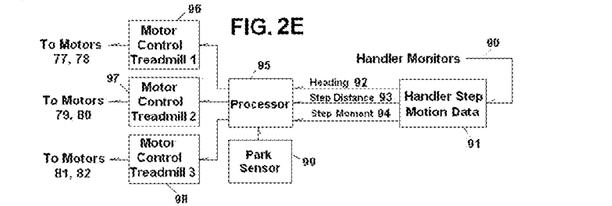
FIG. 2E is a block diagram of exemplary motor control and processor electronics for a three-conveyor circular treadmill.

FIG. 2E shows how the circular treadmill of FIGS. 2A-2L functions electronically. Motion capture cameras or other monitor means 90 turn essential movement on the treadmill into "follow me" commands for the proxy robot, and may also be utilized in keeping the handler centered on the circular simulator stage. Specifically, handler step motion data 91 can be broken into handler heading (yaw or bearing) information 92, handler step distance 93, and step moment or velocity 94.

This data is fed into processor 95, which produces signals that ultimately control the current driving conveyor 1 motor pairs 77, 78; conveyor 2 motor pairs 79, 80; and conveyor 3 motor pairs 81 and 82; from conveyor 1 motor control circuit 96; conveyor 2 motor control circuit 97; and conveyor 3 motor control circuit 98, respectively.

Processor 95 also receives data from park sensor means 99, which monitors each conveyor's movement and continuously feeds alignment data to the processor 95, enabling that processor to signal each conveyor to park (stop) at a point where all tiles line up.

Figures 2F, 2G, 2H, 2J, 2K, 2L:
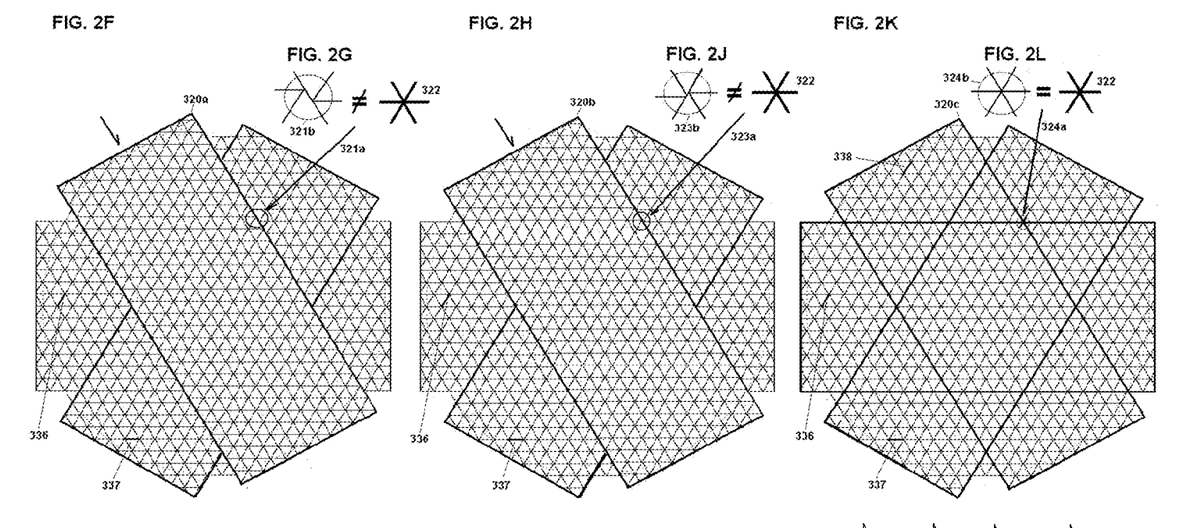
FIG. 2F is a perspective view of a circular treadmill with one conveyor in motion and out of alignment.
FIG. 2G is a magnified illustration of tile misalignment.
FIG. 2H is a perspective view of a circular treadmill with one conveyor in motion and slightly out of alignment.
FIG. 2J is a magnified illustration of slight tile misalignment.
FIG. 2K is a perspective view of a circular treadmill with all conveyors stopped and in alignment.
FIG. 2L is a magnified illustration of complete tile alignment.

FIGS. 2F, 2H and 2K further illustrate conveyor park operation, utilizing the northwest-southeast conveyor of FIG. 2C as an example in each case. In FIG. 2F, the referenced conveyor 320a is moving in a southeast direction (arrow) to compensate for a handler step.

The insert of FIG. 2G depicts a magnified view 321b of the junction between tiles at location 321a, a point where all three conveyors converge. Pattern 322 is the required park position of the various tile edges: note that the actual conveyor tile position at point 321b is considerably off-alignment from the necessary pattern 322.

In FIG. 2H, conveyor 320b continues to move to the southeast (arrow), and relative tile positioning at the same point 323a is considerably closer to alignment now, per magnified view 323b in insert FIG. 2J. But the tiles are not yet aligned as they must be in pattern 322, so conveyor movement continues.

In FIG. 2K, conveyor 320c has reached the point of alignment, as depicted at point 324a and the magnified view 324b of FIG. 2L. At this point, park sensor 99 notifies processor 95 of correct alignment, and processor 95 commands conveyor 320c to stop via treadmill 3 motor control circuit 98.

Figures 2M, 2N:
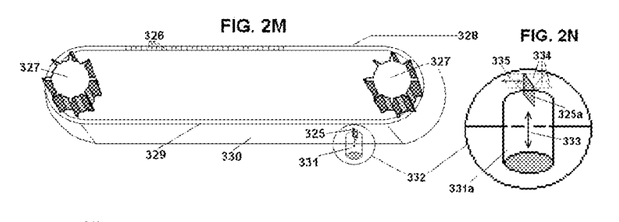
FIG. 2M is a plane view of a conveyor illustrating several alignment means.
FIG. 2N is a magnified illustration of a conveyor stop mechanism.

FIG. 2M illustrates how the park sensor 99 in FIG. 2E can achieve the objective of parking one of the conveyors in perfect alignment with the other two via a number of means. In FIG. 2M, tiles 326 top the simulator stage, comprising conveyors that keep a handler relatively centered at all times. One way to stop a conveyor in correct alignment is to cause "paddle-wheel" gear 327 in FIG. 2M to stop with a tile in some precise position, as, for example, when a paddle of wheel 327 is between two tiles at exact right angles to the horizontal stage 328 supporting the handler.

Such alignment may also be achieved through pattern recognition, as by watching tiles on the moving conveyor for a dot, circle or "x" etched or painted at the center of each tile and stopping the belt when the mark is observed. A stop of this sort may be accomplished by halting paddle wheels 327 or drive roller 49 (FIG. 1B) in proper position, and/or through the employment of a braking mechanism like pads against the correct tile as it passes by roller 49.

In another configuration, a mask or reference pattern such as 322 in FIG. 2G is compared with an area 321b between tiles. When the monitored pattern coincides with the reference, as in FIG. 2L (324b, 322), the park sensor 99 sends a "stop" signal to processor 95 which in turn commands the appropriate treadmill motor control circuit to stop its motors.

A presently preferred mechanical stop apparatus embodiment employs a a semi-flexible blade 325 which can be commanded to protrude from a cylinder 331. The cylinder 331 may represent electro-mechanical solenoid or other means, with the protruding blade scraping against a passing line of tiles 326 which are upside-down on the lower portion of conveyor 328 (c.f. position 4 in FIGS. 1C and 4a in FIG. 1H).

In this case, a small port in the underside 330 of the conveyor housing can be positioned to coincide with a specific position where tiles from all conveyors intersect. This would be like the position shown in FIGS. 2G, 2J and 2L, but 180-degrees removed to the bottom of the unit such as to cause no interference with the active (topside) portion of the simulator stage. Into this small port, the blade 325 of FIG. 2M could be made to protrude through some combination of electromagnetic, spring or hydraulic means in cylinder 331, with flexible blade element 325 flapping against moving tiles as they pass upside-down along the bottom 329 of the conveyor loop, until the blade fits snugly between two tile sets, causing the moving conveyor to stop in precisely the proper position.

FIG. 2N shows the circled area 332 in FIG. 2M in amplified detail, including an electro-mechanical portion represented by cylinder 331a; a line of tiles 334 passing in directions 335; and a blade element 325a moving up and down line 333 upon command from park sensor 99 in FIG. 2E.

To achieve such a stop, semi-flexible blade 325a might be made of spring steel or a strong plastic compound, or the blade might protrude only sufficiently to stop a powered-down conveyor's final momentum. In this latter case, a conveyor would cease being powered as the handler's position approaches stage center. Thereafter, when the handler moves in some direction creating a need for a conveyor to compensate, blade 325a would retract until the handler has been re-centered on the treadmill stage.

Figure 2P:
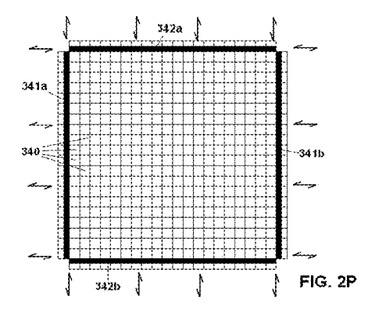
FIG. 2P is an illustration of a perspective view of an exemplary apparatus for achieving a novel "circular" or omnidirectional treadmill incorporating two two-way conveyor mechanisms.
Figure 2Q:
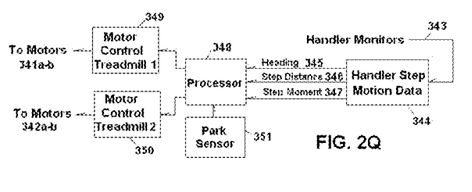
FIG. 2Q is a block diagram of exemplary motor control and processor electronics for a two-conveyor circular treadmill.

FIG. 2P illustrates another omnidirectional treadmill arrangement utilizing square tiles 340 and two conveyor mechanisms. One conveyor moves between the 6 o'clock and 12 o'clock positions by means of motor-driven rollers or paddle-wheel gears 342a and 342b, while the other conveyor moves between 3 o'clock and 9 o'clock positions via rollers or paddle-wheel gears 341a and 341b. Although simpler to manufacture and operate, the square-tile, two conveyor configuration of FIG. 2P is not currently preferred due to the jerky movements necessary to keep a handler centered on the treadmill stage. Otherwise, this treadmill would generally incorporate elements discussed heretofore in FIGS. 1 and 2 with one exception:

FIG. 2Q depicts that exception: treadmill motor control means for two rather than three conveyors. In this diagram, motion capture cameras or other monitor means 343 turn essential movement on the treadmill into "follow me" commands for the proxy robot, and may also be utilized in keeping the handler centered on the circular simulator stage. Specifically, handler step motion data 344 can be broken into handler heading (yaw or bearing) information 345, handler step distance 346, and step moment or velocity 347.

This data is fed into processor 348, which produces signals that ultimately control the current driving conveyor 1 motor pairs 341a and 341b, and conveyor 2 motor pairs 342a and 342b: from conveyor 1 motor control circuit 349 and conveyor 2 motor control circuit 350, respectively.

Processor 348 also receives data from park sensor means 351, which monitors each conveyor's movement and continuously feeds alignment data to the processor 348, enabling that processor to signal each conveyor to park (stop) at a point where all tiles line up.

Figure 3:
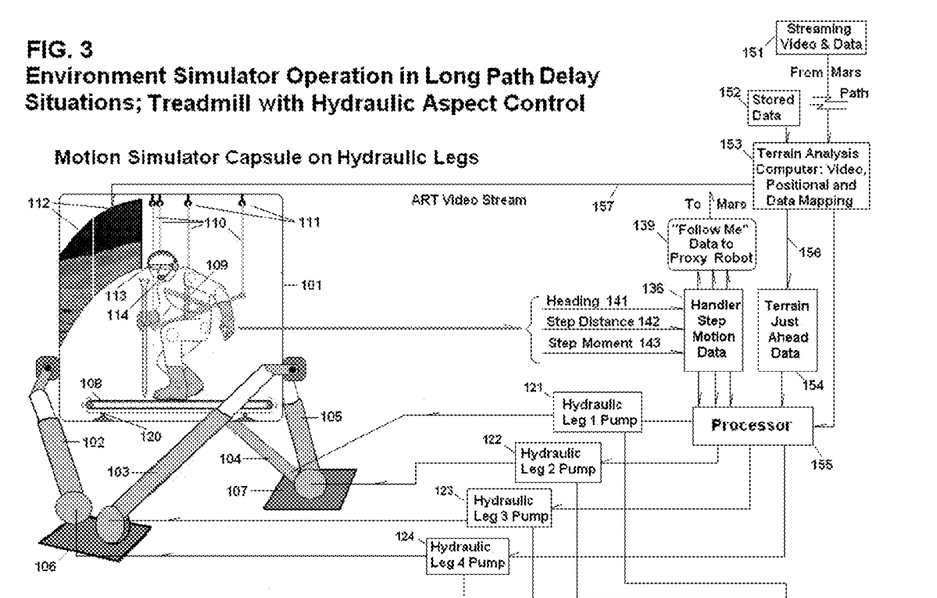
FIG. 3 is a plane view of a treadmill with hydraulic aspect control including exemplary control electronics.

FIG. 3 illustrates one exemplary method and apparatus for the addition of pitch and roll to a circular treadmill simulator for human proxy robot handlers, wherein legs 120 under an ommnidirectional treadmill 108 like the one shown in 1B above are firmly mounted to the floor of a modified or custom made motion simulator 101. Motion simulators are typically costly devices, with pitch, roll and various vibratory sensations (like earthquakes, rocket engines or runaway trains) are created by varying the length of four or more large hydraulically extending arms 102-105 resting on large floor pads 106, 107, and a large wrap-around video screen 112 creates the appropriate visual environment.

As a consequence, the goggles 113 worn by the handler in this drawing are likely for 3-D viewing, while a two-way headset 114 may still be employed for mission and team communication as well as voice commands like "Freeze, Freeze." Although the same ends could be accomplished via a microphone and speakers not directly connected to the person of the handler, the headset 114 serves the additional purpose of isolating the handler from ambient noise including operational sounds of the motion simulator.

As she walks or otherwise moves on the circular treadmill 108, the handler is held in place by a gravity harness 109 with bungee cords or springs 110 which hang from hooks 111 in the top of the motion simulator capsule 101 and provide lift to her suited body sufficient to equal the weight of the proxy robot on Mars or some other location in space.

Let us turn now to meeting the challenges of long path delay, as in the case of Earth-Mars. As we have explored in the description of previous figures, the approximated real time (ART) video generating terrain analysis computer 153 receives streaming video and other data from multiple sources 151 at the remote location (e.g., Mars), and combines this information with data 152 already stored and fully accessible to the terrain analysis computer.

While the most major function of the terrain analysis computer is the generation of accurate ART video 157 for the proxy robot handler as well as an ongoing stream of "terrain just ahead" data 156 to warn and otherwise guide that handler's every move, the terrain analysis computer can also supply data to a processor 155 that controls the environment simulators in which handlers perform their functions.

In the case of motion simulator capsule 101, processor 155 can feed signals to hydraulic leg pumps 121-124, where each hydraulic pump controls the height of an extendable-contractible leg. So, for example, pump 121 controls the amount of extension in leg 104, while pump 122 controls the same function in leg 105. In practice, any normally-encountered amount of pitch (tilt forward or backward) roll (tilt from one side to the other) or combination thereof can be replicated via signals originating in incoming data from a remote location such as Mars together with stored mapping data that becomes an augmented virtual reality view of the time in the future when "follow me" data from the handler will reach the proxy robot. Put another way, the terrain analysis computer is not only providing a handler with video that is 10 minutes or more in the future, but also replicating the terrain conditions that handler will be encountering at that moment in time.

Figure 3A:
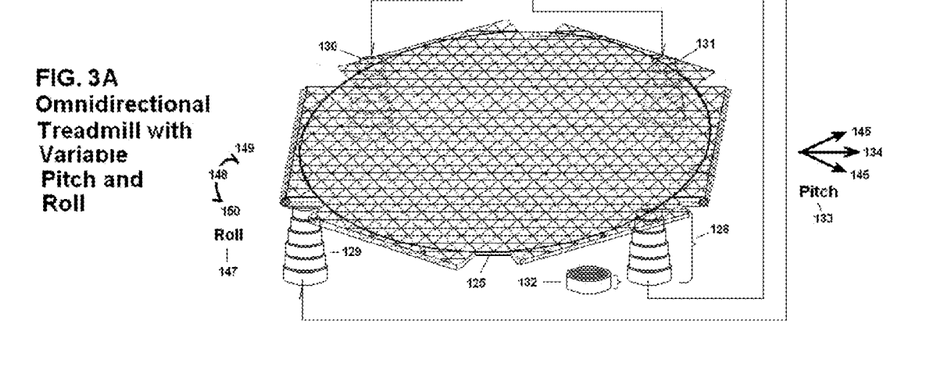
FIG. 3A is a plane view of an omnidirectional "circular" treadmill with variable pitch and roll including exemplary control electronics.

FIG. 3A depicts an exemplary embodiment of an omni-directional treadmill 125, under which are four legs 128-131 extendable via hydraulic, pneumatic or other means from a relatively flat profile 132 to many times that height 128. When all legs are in their compacted state, the plane of treadmill 125 is flat, without tilt in any direction, but this state can be altered by signals originating at the terrain analysis computer 153 and passing through processor 155 and the four hydraulic leg pumps 121-124.

Let us first consider pitch. If we want to tilt the treadmill up from front to back 145, front legs 129 and 130 should be in their compressed state, while back legs 128 and 131 will be totally or partially extended to achieve the desired rise to the rear of the treadmill. Front-up, rear-down pitch 146 is achieved by doing the opposite: extend front legs 129 and 130 and compress back legs 128 and 131.

In the case of roll, we can tilt (roll) the treadmill downward toward the right side 149 by compressing legs 130 and 131 while extending legs 128 and 129, or conversely tilt downward toward the left side 150 by compressing legs 128 and 129 while extending legs 130 and 131.

The accurate simulation of some remote terrain might involve a degree of both pitch and roll: for example, as the proxy robot climbs an irregular incline. Simulating this condition might involve fully compressing left rear leg 128, fully extending right front leg 130, and partially extending legs 129 and 131—all in accordance with terrain data received from video and sensors on the proxy robot.

Figure 3B:
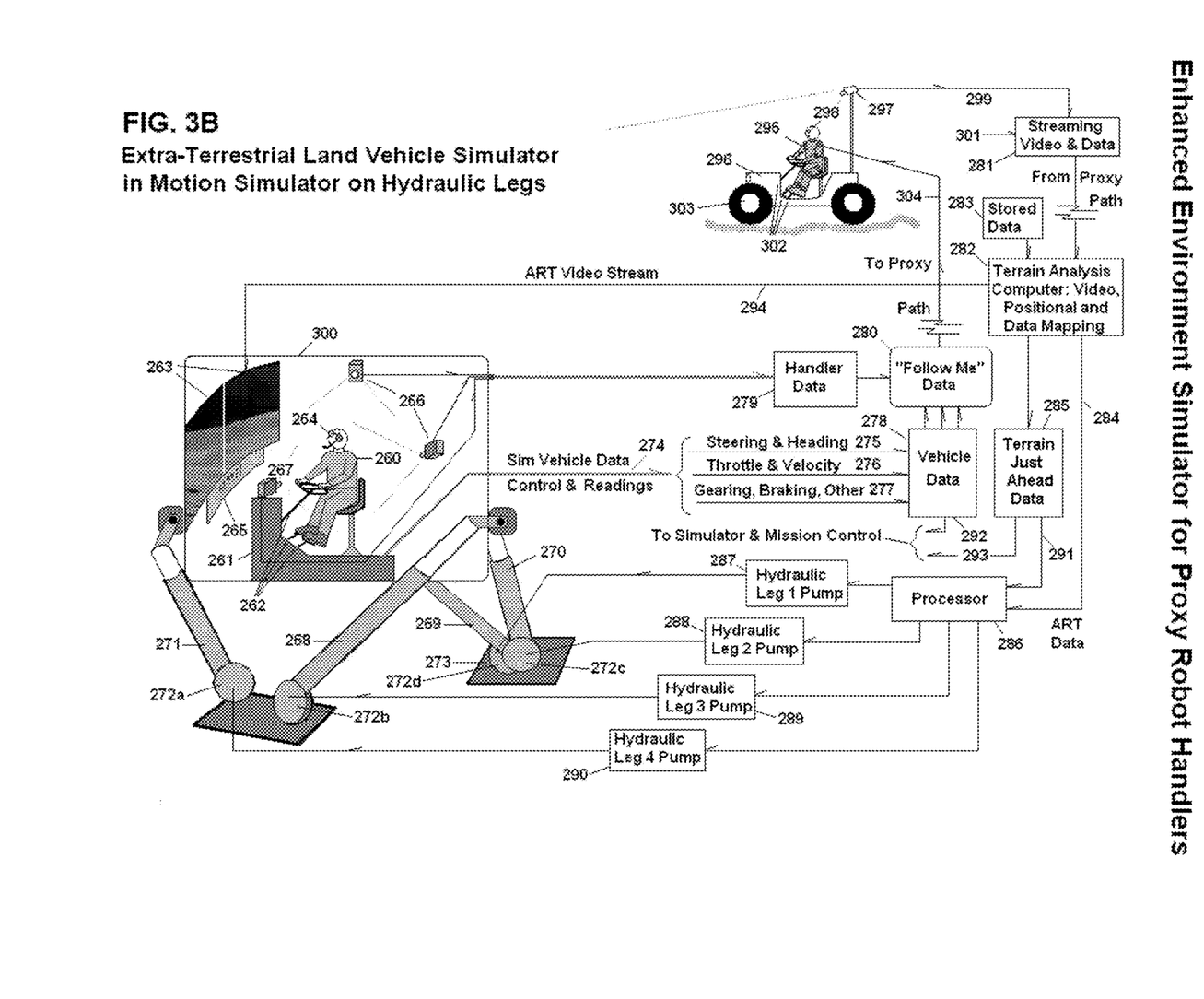
FIG. 3B is a block diagram including plane view illustrations of an exemplary simulator for the control and operation of an extra-terrestrial land vehicle.

FIG. 3B illustrates an exemplary method and apparatus for a remote vehicle simulator in a capsule 300, wherein pitch, roll and various vibratory sensations may be created by varying the length of four or more large hydraulically extending legs 268-271 resting on large floor pads 273, with the extension of each leg controlled by a hydraulic valve 272 connected to a pump and motor 287-290.

The employment and utilization of proxy robots for missions on remote locations like space environments permits the use of vehicles of the sort that can be operated and driven by humans as opposed to robotic vehicles in a space location that are programmed and/or remotely operated from earth or some other control point. In the proxy robotic case, it is the proxy robot 295 that actually drives and operates the remote vehicle 296, in concert with a human handler 260 who "drives and operates" a simulation 261 of the proxy's vehicle from the safety of the simulator in capsule 300.

Controls like steering, brake and throttle 302 in the remote vehicle 296 are precisely replicated 262 in simulated vehicle module 261. The human handler 260 can either control the remote vehicle 296 by viewing a large wrap-around video screen 263 or via goggles 264 in a head-mounted display. Either or both create the exact visual environment perspective of the remote proxy robot 295 at an upcoming future point in time when the operational data reaches the remote vehicle 296.

Terrain analysis computer 282 receives video, positional data and other information from aggregator 281 which aggregates streaming video 299 from the camera "eyes" 298 of proxy robot 295, look-ahead video from mast camera 297 and other video and data from multiple sources 301 at the remote location (e.g., the moon or Mars). This information from the remote location is combined with data 283 already stored in and fully accessible to the analysis computer 282.

A primary function of terrain analysis computer 282 is the generation of accurate approximated real time (ART) video 294 for the proxy robot handler as well as to a "terrain just ahead" processor 285 that generates an ongoing stream of data 291 to warn and otherwise guide that handler's every move.

The terrain analysis computer 282 also supplies data to a processor 286 that controls the pitch, roll and replicates other conditions like a rough or bumpy environment being experienced by the remote vehicle 296 and its proxy robot driver 295.

In the case of vehicle motion simulator capsule 300, processor 286 feeds signals to hydraulic leg valves 272*a-d*, where each hydraulic valve controls the height of an extendable-contractible leg. For example, pump 287 and valve 272*d* control the amount of extension in leg 269, while pump 288 and valve 272*c* control the same function in leg 270.

In practice, any normally-encountered amount of pitch (tilt forward or backward) roll (tilt from one side to the other), rough or bumpy ride, or combination thereof can be replicated via signals originating in incoming data from a remote location such as Mars together with stored mapping data that becomes an augmented virtual reality view of the time in the future when "follow me" data from the handler will reach the proxy robot vehicle operator. Thus, terrain analysis computer 282 is not only providing a handler on Earth with video that is 10 minutes or more in the future in the case of Mars, but also is replicating the terrain conditions that the proxy robot's remote vehicle will be encountering at that very moment in time.

"Follow me" commands from human handler "driver" to proxy robot driver are a composite of data from several sources. Positional information from the handler, including head angles, hand and foot positions and so forth, are collected by a plurality of motion capture cameras 266-267 and aggregated in handler data circuit 279. Control and reading data 274 from the vehicle simulator, including steering position and vehicle heading information 275; throttle position and vehicle velocity 276; gear and braking data 277 are fed into vehicle data module 278, along with other information such as blade or backhoe position, depending on the vehicle and the mission requirements.

Handler data 279 and vehicle data 278 are weighed and combined in a "follow me" data processor 280 which uses both sources to send the most precise position commands possible over path uplink 304 to the remotely-located proxy robot operator 295 of vehicle 296 on the surface of the moon, Mars, or some other location remote from mission control. It should be pointed out that the definition of a remote location does not exclude locales on the Earth, like disaster sites, under sea projects, natural event locations like volcanoes, tsunami and tornados as well as survey vehicles, mining, and even the movement of goods and services from one place to another.

In like manner, data and readings from vehicle data 292 and terrain just ahead 293 modules are routed to mission control, including panel 265 or a portion of either wraparound video screen 263 or handler head-mounted display 264 to maintain the handler informed to the greatest possible extent.

Figure 4:
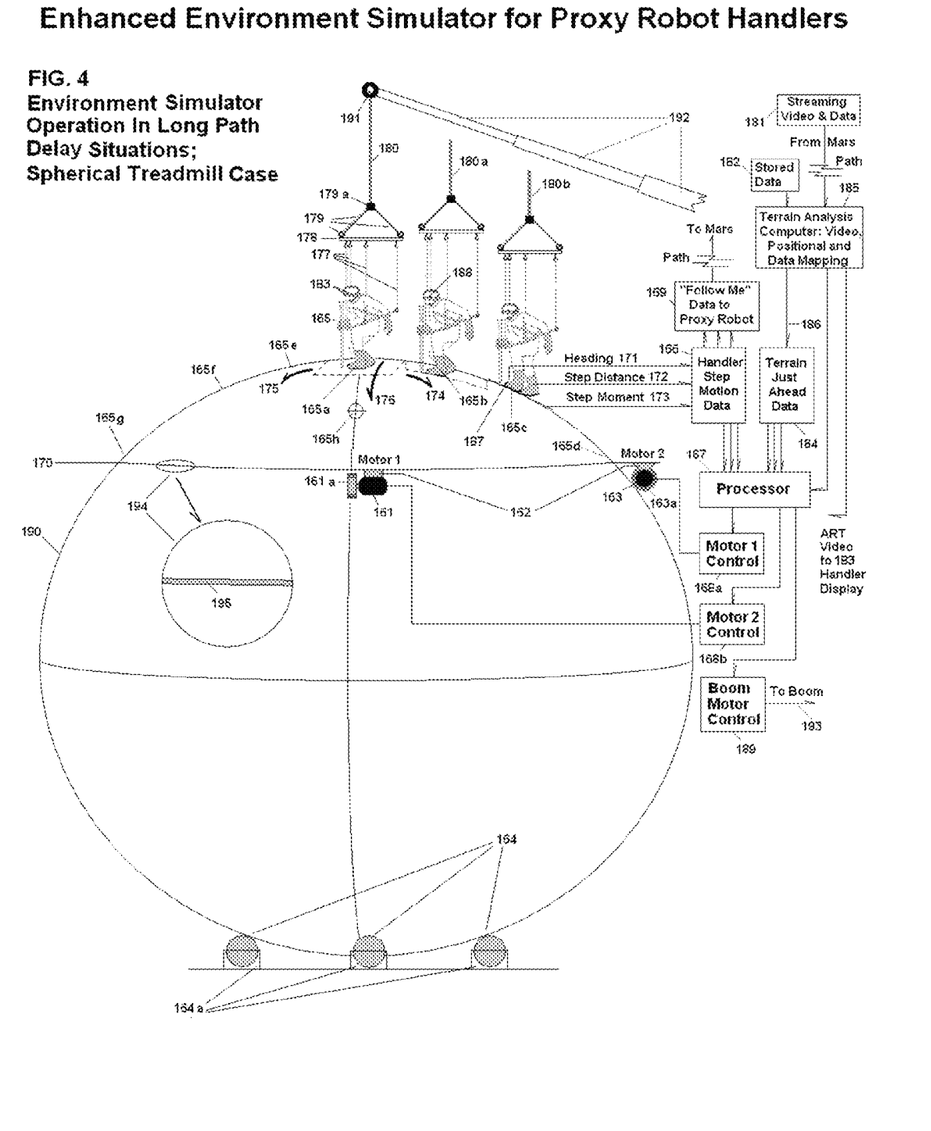
FIG. 4 is a block diagram and plane view illustration of an exemplary spherical treadmill including control electronics.

FIG. 4 illustrates an example of a spherical treadmill with variable pitch, roll and infinitely variable heading. In this novel approach, the treadmill takes the form of a large sphere 190, with a diameter many times average human height; e.g., at least three times but preferably five or more times human height. The diameter of sphere 190 in this figure is approximately 30 feet, but the simulator staging area typically occupies only the top 25% to 35%, as depicted by floor line 170. The sphere protrudes from a circular opening in upper floor 170, and a small area 194 where floor meets sphere is magnified 195 to depict Teflon® or a flexible, renewable material such as bristles, rubber or plastic between the two surfaces. In addition to keeping debris from falling through the floor, this junction 195 serves to stabilize the sphere and smooth its motion.

The sphere 190 can be made of a lightweight but strong material such as plastic, aluminum or composite coated with rubber or a similar no-slip substance. It rests upon three or more large bearings 164, with each bearing seated in a socket 164*a* which is mounted firmly in place to the support floor under sphere 190. Bearings 164 and their lubricated sockets 164*a* assure movement of the sphere with minimum friction, allowing pressure wheel motors 161 and 163 to be relatively small and economical.

In the upper (simulator stage) portion of the sphere 190, a human handler 165 is taking a step to direct her proxy robot's course. As this takes place, data indicating handler heading 171, step distance 172 and step moment (time duration and velocity) 173 is sent to handler step motion circuitry 166 which sends appropriate data representing each parameter to both the proxy robot as part of a "follow me" data string 169 and to a processor 167 that feeds either digital or analog data to motor control circuitry 168*a*, 168*b* as well as to boom control 189.

If the proxy robot is walking on flat terrain, the human handler will occupy position 165*a* at the very top, center of sphere 190. Although that handler will be atop a very slight rise equal to the rise atop that section of the sphere, the simulation from a sphere five times the human's height will be of a relatively flat surface.

But if the robot is walking up a rise akin the slope in FIG. 3C, this positive (nose up) pitch of around 10 degrees can be simulated by situating the handler in position 165*b* on the sphere. A more severe forward pitch of approximately 20 degrees is shown as position 165*c* on the sphere, while at position 165*d* near floor level, rise in pitch approaches 45 degrees. Positive (upward) pitch is represented by arrow 174 in the drawing, while downward or negative pitch is represented by arrow 175.

Downward pitches on the same heading at −10, −20 and −45 degrees can be simulated from positions to the left of the sphere, at 165*e*, 165*f* and 165*g*, respectively. If the handler's position moves left in the direction of arrow 176, there will be leftward roll (left tilt) in that position. For example, position 165*h* would exhibit severe roll, tilting some 25 degrees to the left. Moving the operating stage in the opposite direction (hidden from view) will result in roll to the right (right tilt). From the foregoing, it can be seen that any conceivable combination of pitch and roll can be found at various locations on the surface of the spherical treadmill 190.

Since the pitch and roll conditions in the simulator beneath the human controller are determined by feedback 181 from the proxy robot's remote location, suitable means must be present to change the location of the handler staging area to one matching the average pitch and roll of the remote terrain. Positional and other data is received from sources on the "person" of the proxy robot, including both near- and far-field 3-D video from its various camera "eyes" and possibly even a long-range 360-degree view from a camera system on top of the robot's head (c.f. FIG. 2) Video and other data come as well from sources external to the proxy robot: orbiting satellites, balloons, pole cameras, buoy cameras and other robots.

The video feed from the remote location is routed to display devices for the analysis of mission personnel, but it does little good for the handler, since it is delayed on the order of 3-22 minutes from Mars. All video and data 161 from the remote locale moves over this communication path before being routed to a Terrain Analysis Computer 185 which generates a highly-precise augmented virtual reality view of the terrain and setting of the proxy robot at 10 minutes into the future when signals from the handler actually arrive at the mission site on Mars. Computer 185 also uses the stored and incoming information to generate data 186 about terrain just ahead 184 for the information and use of the handler.

The "terrain just ahead" data 186, heading 171, step distance 172, and step moment 173 data are bundled and fed to a processor 167 which turns all the input data streams into meaningful signals to drive motor control circuitry 168a, 168b and boom control 189.

Motor control circuits 168a and 168b convert the data from processor 167 into positive or negative direct current to drive motors 161 and 163 and their respective pressure rollers 161a and 163a in either direction when so instructed by processor 167, causing the sphere to turn under the handler's feet to compensate for steps the handler takes forward, backward or in any direction whatever. But since it is also acting from signals representing such upcoming terrain conditions as pitch 174-175 and roll 176, it is the function of the roller motors to effectively move the sphere under the handler as each step is taken to place that person in average pitch and roll conditions matching the remote terrain to the greatest extent possible.

Motor mounts 162 are illustrated to show a possible position for a pressure solenoid that can activate whenever a roller motor is called into service, pushing, for example motor 161 and its attendant roller 161a harder into the sphere to gain traction. The advantage of using solenoids in this manner is that the non-active roller(s)—from motor 163 and its roller 163a in the example—provides less drag for the active motor and roller to overcome. Of course there may be instances when both roller motors (or two or more motors from a multiplicity of roller motors spaced at even intervals around the sphere) may be called into action simultaneously. But in this case there will be less drag to overcome as motion overcomes inertia, even with all solenoids pushing the motors' rollers into the sphere. Although roller motors 161 and 163 are depicted as mounted against the upper floor 170, they can also be mounted at the sphere's equator or in any other convenient position.

In the simulator, the human handler would be strapped into a gravity harness suspended from a platform 178, 179 by a number of bungee cords or cables with springs 177. A rotation collar 179a allows the platform to rotate freely in any direction. As the handler is effectively moved about on the staging surface of the upper sphere, it is important that the gravity harness follow those movements to maintain the handler's correct effective weight, by lifting from a position directly above the handler and harness. In the drawing, three handler positions are depicted: 165a which is relatively flat, 165b with a positive pitch 10 degrees, and 165c with a forward incline of some 20 degrees.

Roller motors 161 and 163 can place the handler in any of the above positions or virtually anywhere else on the simulator stage, but an additional mechanism is needed to move the gravity harness as the handler is moved. This mechanism is an extendable boom or robotic arm 192 shown at the top of the drawing, which provides overhead lift as well as positional correctness directly over whatever handler's position. The boom or robotic arm depicted is for illustrative purposes only, as it can be appreciated that other combinations of tracks, motors and cables can place the handler at the required positions.

At the tip of the boom is a winch 191. The motorized winch maintains constant torque (upward pull) on the handler at some predetermined level. For example, if the handler is to match the 76 lb. weight on Mars of a 200 lb. robot, that handler's weight should be effectively 76 lbs. So a 160 lb. human handler would require a constant upward pull of 84 lbs., and a downward pull by gravity of 76 lbs. It is the job of winch 191 to maintain this effective weight. The winch pays out as much cable 180 as necessary to constantly maintain the desired upward pull on the handler, and it receives data from processor 167 via boom motor control circuit 189. The cable positions 180, 180a and 180b are maintained directly over handler positions 165a, 165b and 165c, respectively, by lateral movement of the boom, which can extend/retract; swing right or left, and tilt up or down in accordance with data instructions from processor 167 and boom motor control 189.

Maintaining constant torque solves one problem; namely, that the length of cable 180 must change the further the handler is moved from the "flat" position 165a at top center. So when processor 167 and roller motors 161, 163 act to place the handler in position 165c, for example, the length of cable 180 would leave the handler dangling in mid-air. But not really, since such dangling weight would equal 160 lbs downward. Immediately, the constant torque mechanism would tell the winch to let out more cable until the handler once again exerts 76 lbs downward and 84 lbs upward.

Boom 192 does more than extend and retract to replicate various up and down levels of pitch, however. In response to instructions from processor 167, which in turn receives "terrain just ahead" data 184 and other position and mapping information from the terrain analysis computer 185, boom 192 can also move from side to side to replicate roll—the sideways tilt of the place where the proxy robot will be walking some ten minutes in the future. Together, these boom movements account for both pitch and roll: two of the three movements possible in three-dimensional space.

The third element is yaw—in this case the direction the handler is facing or moving on a 360-degree plane. This element is determined by the handler, and is translated into heading signals 171, which, together with step distance 172 and step moment 173 data, are packaged and translated by Handler Step Motion Data electronics 166 into "follow me" proxy robot language 169 to guide the proxy's every move. The "follow me" data that travels over an uplink path to Mars or whatever remote mission location, arriving at the exact moment anticipated by Terrain Analysis Computer 185.

Figure 5A:
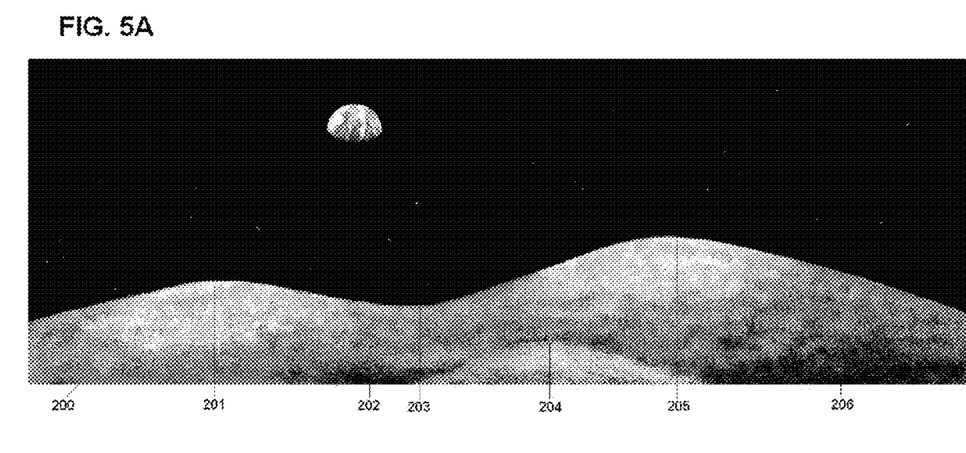
FIG. 5A is an illustration of an exemplary scene on the Moon.
Figure 5B:
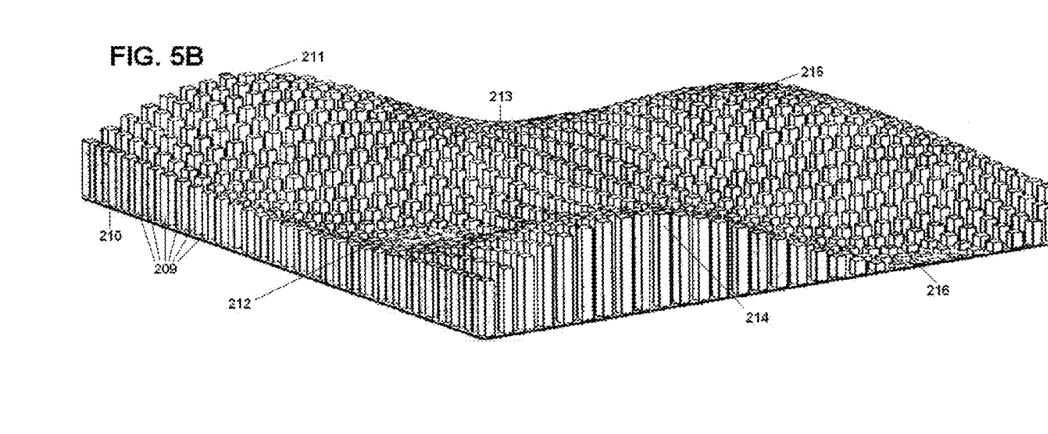
FIG. 5B is an illustration of the same exemplary scene on the Moon in bar chart form.

FIG. 5A illustrates a scene on the moon, rendered pictorially, while FIG. 5B depicts the same scene in 3D bar chart form. In the photographic version of the scene 200 (top), we see two hills with summits 201 and 205, with a saddle 203 between them. In front of these two hills is a smaller hill with summit 204, and two low or valley areas 202 and 206.

This same terrain can be computer-rendered into a three-dimensional bar chart like 210 in FIG. 5B, where individual bars 209 in a matrix represent the elevation at each charted point. For example, the summit of the first hill 201 in FIG. 5A is represented by point 211 in FIG. 5B; higher hill summit 205 is represented by bar 215; saddle 203 by bar 213; front hill summit 204 by bar 214; valley 202 by bar 212; and valley 206 by bar 216.

Programs already exist to make such 3D bar chart renderings, but the purpose of the figure and description to follow is to bring the bar chart into material reality through the creation of physical hills and valleys as part of a highly immersive environment simulator.

Figures 6A, 6B, 6C:
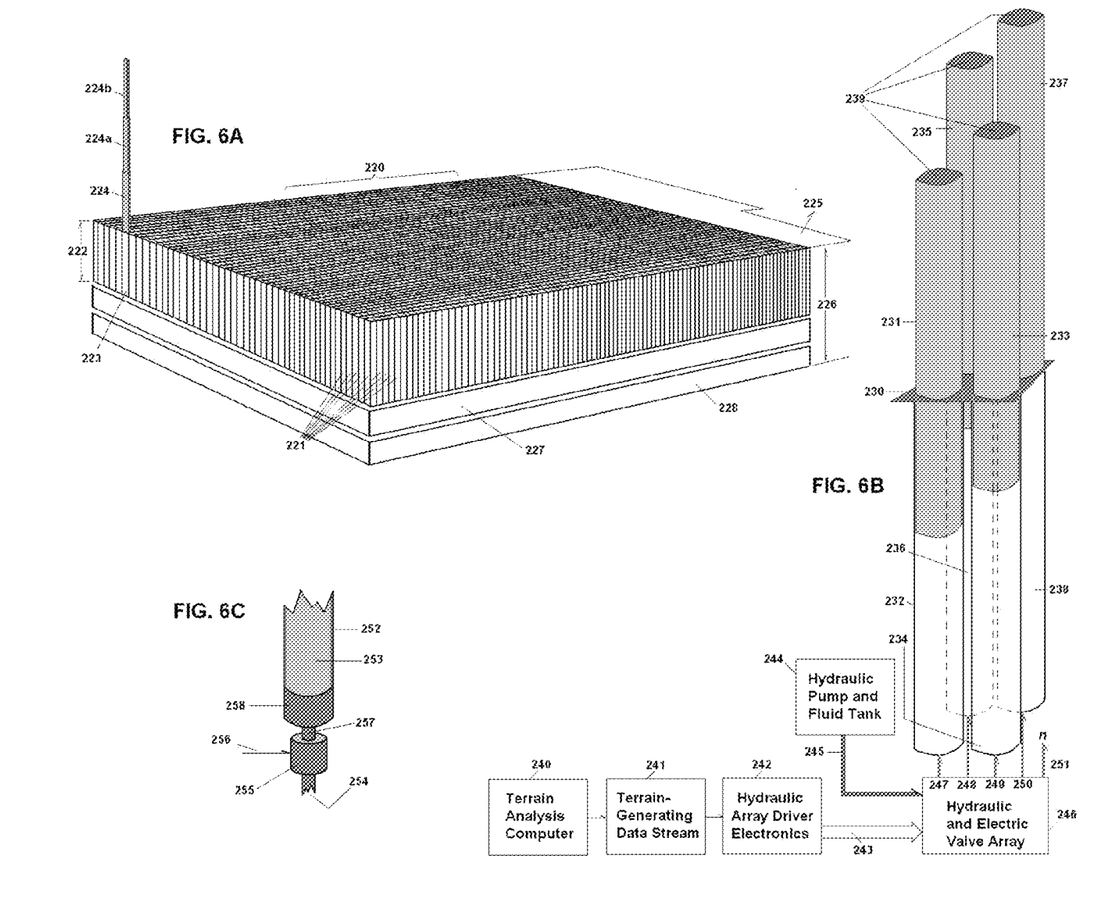
FIG. 6A is an illustration of an exemplary array of extendable piston rods.
FIG. 6B is a detailed illustration of four exemplary extendable piston rods including control electronics.
FIG. 6C is a magnified view of a section of an exemplary extendable piston mechanism.

FIG. 6A depicts a matrix similar to that of the 3D bar chart in FIG. 5B above, but with physical piston rods replacing each bar in the drawing. In FIG. 6A, a matrix array 220 of piston rods 221 are enclosed in individual cylinder housings 223 of some uniform height 222. Each individual piston rod can be controlled hydraulically to extend above its cylinder by an amount either equal to the height of the cylinder 224 or even greater if the rod portion uses telescoping means such as 224a and 224b.

The plane area 225 defines the floor of an environment simulator, with tiles atop the embedded rod elements 221 forming a three-dimensional surface. Immediately beneath cylinder matrix 220 in area 227 is an array of hydraulic valves that connect to each individual cylinder. Beneath this is another area 228 reserved for one or more hydraulic motors, pumps and the electronic equipment that connects to a valve under each cylinder.

FIG. 6B shows four adjacent cylinder-rod assemblies in greater detail, where the simulator floor 230 corresponds to plane 225 in FIG. 6A, and rods 231, 233, 235 and 237 are depicted in various stages of extension above that floor. While widely-varying positions are shown for rod ends 239, in actual practice adjacent rods would be only slightly removed one from the other, creating a smooth incline or decline in the overall 3D environment. Rods 231, 233, 235 and 237 in FIG. 6 are basically pistons that move up and down from their positions in cylinders 232, 234, 236 and 238, respectively.

The non-shaded portion in each of these cylinders represents space filled with the hydraulic fluid that displaces each piston. For example, piston 237 is shown fully extended, so its cylinder is completely full of hydraulic fluid, while cylinder 323 is extended about 65%. It should be noted that FIG. 7B utilizes non-telescoping cylinder elements, a presently preferred configuration.

A complete three-dimension environment can be created when the terrain analysis computer 240 described in previous figures is harnessed to provide a terrain-generating data stream 241 in addition to approximated real time (ART) video and other outputs. The terrain-generating data is fed to hydraulic array driver electronics 241 which produce elevation signals 243 for each individual hydraulic cylinder-piston element in the electronically-operated hydraulic valve array 246. The number of these cylinder-piston elements may be large indeed. For example, a 40 ft×40 ft simulator room with 2 inch×2 inch tiles would require 40×6=240 tiles per side, or 57,600 tiles total, translating to 57,600 individual cylinders and pistons, 57,600 hydraulic valves, and 57,600 circuit connections from hydraulic array driver electronics 242.

FIG. 6B shows four such valves 247-250. Each of these receives signals from hydraulic driver array electronics 242 that cause each valve to open and permit a designated pressure and volume of fluid from hydraulic pump and fluid tank 244 to enter the cylinder and push the piston rod to the elevation called out by terrain analysis computer 240.

In FIG. 6C, a single section of cylinder 252, piston rod 253, hydraulic fluid intake 254, electrically-controlled hydraulic valve 255, electronic signal 256, and hydraulic fluid pipe 257 connect together to fill chamber 258 to the level that generates the required elevation for that particular cylinder-piston rod element.

In sum, the circuitry and apparatus described in FIG. 6 can rapidly generate a physical replica of a mission area on the moon, Mars, or other locations in space or on earth with the physical integrity to support the weight of human handlers, robotic "follow me" vehicles and the like, to ensure the accuracy and maximize the productivity of a proxy robotic mission to that area. When it is time for the proxy robots or robotic vehicles to move on, a new physical landscape can rapidly be generated and put to good use by human handlers on the earth and their robotic counterparts at some remote location.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

I claim:

1. An omnidirectional treadmill environment simulator comprising:
    a generally circular simulator stage area;
    a first set of a plurality of tiles individually shaped as unattached equilateral triangles which mesh together to form the generally circular simulator stage;
    a second set of a plurality of tiles directly corresponding to the first set of the plurality of tiles but inverted from the first set, wherein the second set of the plurality of tiles constitutes the bottom portion of the omnidirectional treadmill;
    a plurality of transport mechanisms configured to maintain a user at or near the center of the generally circular simulator stage area,
    wherein each of the plurality of transport mechanisms couples one subset of tiles from the first set of tiles to a corresponding subset of tiles from the second set of tiles and enables movement of its coupled tile subsets in one of two directions of an axis, and
    wherein the plurality of transport mechanisms is operational to enable movement of the tile subsets along three different axes;
    at least one processor, wherein the at least one processor is configured to collect position data of the user, and wherein the at least one processor is configured to process the position data to control the plurality of transport mechanisms;
    a receiver for receiving data from a remote location;
    a terrain analysis computer for processing the data received from the remote location,
    wherein the terrain analysis computer is further configured to collect the data received from the remote location to form an accurate simulation of an upcoming condition at the remote location; and
    a transmitter for transmitting the position data to the remote location.

2. The omnidirectional treadmill environment simulator of claim 1, wherein each of the plurality of transport mechanisms further comprises a plurality of ball bearings attached to a portion of the plurality of tiles wherein a motor-driven roller mechanism causes the tiles and attached ball bearings to move along one of the three axes.

3. The omnidirectional treadmill environment simulator of claim 1, wherein the transport mechanism further comprises a gear and sprocket mechanism.

4. The omnidirectional treadmill environment simulator of claim 1, wherein the transport mechanism further comprises an elongated paddle-wheel gear.

5. The omnidirectional treadmill environment simulator of claim 1, wherein position data includes data from monitors that capture the movement of the user.

6. The omnidirectional treadmill environment simulator of claim 5, wherein the transmitter transmits the position data to a remotely-located robotic device to enable follow-me commands to control the remotely-located robotic device.

7. The omnidirectional treadmill environment simulator of claim 1, wherein the transport mechanism further comprises a park mechanism to precisely align all tile subsets each time a moving transport mechanism stops.

8. The omnidirectional treadmill environment simulator of claim 1, further comprising a plurality of extendable legs controlled by the at least one processor configured to extend and contract to simulate contours of a surface terrain.

9. The omnidirectional treadmill environment simulator of claim 8, wherein the at least one processor is further configured to receive terrain data from a remote location and the processor processes the received terrain data for the extension and contraction of the plurality of extendable legs.

10. The omnidirectional treadmill environment simulator of claim 1, further comprising a gravity harness that attaches to the user to provide lift of the user to simulate a reduced gravity environment.

11. The omnidirectional treadmill environment simulator of claim 1, further comprising a conveyance guide to guide the plurality of tiles around the semi-circular sides and bottom of a continuous tile loop of each transport mechanism.

12. The omnidirectional treadmill environment simulator of claim 1, wherein the plurality of tiles are individually shaped as squares which mesh together to form the floor of the simulator stage.

13. The omnidirectional treadmill environment simulator of claim 1, wherein the at least one processor is further configured to send a plurality of location parameters of the user to a robotic device at a remote location.

14. The transport and park mechanisms of claim 4 or 7, wherein the elongated paddle-wheel gear stops a moving tile subset in a precise position.

15. The park mechanism of claim 7, further comprising pattern recognition wherein a sensor monitors marks on passing tiles and causes the transport mechanism to stop when the sensor is precisely aligned with a mark.

16. The park mechanism of claim 7 or 15, wherein a sensor monitors patterns in the transition between moving and stationary tile subsets and causes the moving transport mechanism to stop precisely when a reference pattern is observed.

17. The park mechanism of claim 7, wherein a semi-flexible blade protrudes and scrapes against a passing subset of tiles until the blade penetrates a specific notch pattern to stop the tile subset where all conveyors intersect.

18. The park mechanism of claim 17, wherein the semi-flexible blade protrudes from a solonoid which activates to stop the tile subsets in an aligned position.

19. A method for simulating a remote environment utilizing an omnidirectional treadmill with a plurality of equilateral triangular tiles comprising:
transporting a set of the plurality of tiles along one axis across the top of the simulator stage area, down one side, across the bottom and up the opposite side in a continuous loop by at least one of a plurality of transport mechanisms,
wherein unattached individual tiles mesh together to form a floor of the simulator stage and inverted unattached tiles mesh together at the bottom of the omnidirectional treadmill;
maintaining a treadmill user at or near the center of the simulator stage by collecting user position data by at least one processor;
processing the user position data by the at least one processor to control the plurality of transport mechanisms;
engaging each of the plurality of transport mechanisms as needed to enable movement of tile sets across the simulator stage in three different axes and two directions for each of the three different axes to maintain the user at or near the center of the generally circular stage;
receiving data from a remote location;
processing the remote location data by a terrain analysis computer,
wherein the terrain analysis computer is further configured to process the data received from the remote location to form an accurate simulation of an upcoming condition at the remote location; and
transmitting the user position data to the remote location.

20. The plurality of transport mechanisms of claim 19, wherein each transport mechanism further comprises a park mechanism to precisely align all tile sets each time a moving transport mechanism stops.

21. The user position data processor and transmitter of claim 19, wherein the processor converts user position data from motion monitors into follow-me commands and the transmitter relays the follow-me commands to a proxy robot at the remote location.

* * * * *